United States Patent
Chua et al.

(10) Patent No.: US 8,319,151 B2
(45) Date of Patent: Nov. 27, 2012

(54) METHOD TO MANUFACTURE A HEARING AID WITH INDIRECT LASER EXPOSURE

(75) Inventors: Tze Peng Chua, Singapore (SG); Matthias Jorgas, Bocholt (DE); Harald Klemenz, Fuerth (DE); Eng Cheong Lim, Singapore (SG); Pei Chyi Kristy Lim, Singapore (SG); Nisha Shakila Ma, Singapore (SG)

(73) Assignee: Siemens Medical Instruments Pte. Ltd., Singapore (SG)

( * ) Notice: Subject to any disclaimer, the term of this patent is extended or adjusted under 35 U.S.C. 154(b) by 299 days.

(21) Appl. No.: 12/706,920

(22) Filed: Feb. 17, 2010

(65) Prior Publication Data
US 2010/0206860 A1    Aug. 19, 2010

(30) Foreign Application Priority Data
Feb. 17, 2009 (DE) .......... 10 2009 009 273

(51) Int. Cl.
*B23K 26/00* (2006.01)

(52) U.S. Cl. ......... 219/121.85; 219/121.61; 219/121.74; 219/121.76

(58) Field of Classification Search ............. 219/121.85, 219/121.61, 121.74, 121.76
See application file for complete search history.

(56) References Cited

U.S. PATENT DOCUMENTS

| 5,578,227 A | 11/1996 | Rabinovich |
| 5,620,754 A * | 4/1997 | Turchan et al. ............ 427/554 |
| 2005/0175925 A1 * | 8/2005 | Johnson et al. ........... 430/270.1 |

FOREIGN PATENT DOCUMENTS
DE    195 38 257 A1    4/1996

OTHER PUBLICATIONS

"Rapid Manufacturing in der Hörgeräteindustrie," Klare et al. RTejournal, vol. 2, No. 2 (2005) pp. 1-19.

* cited by examiner

Primary Examiner — Tu-Tu Ho
(74) Attorney, Agent, or Firm — Schiff Hardin LLP

(57) ABSTRACT

To further automate the manufacture of hearing aid component parts that are in part produced with a rapid prototyping method, a laser beam for curing material is generated by a laser, and a workpiece support that can be directly exposed by the laser is provided. The laser beam is deflected by an optic device so that the workpiece support can be indirectly exposed with the laser. Material can thereby be more easily applied in undercuts of workpiece blanks that form the basis of the hearing aid component parts.

5 Claims, 2 Drawing Sheets

METHOD TO MANUFACTURE A HEARING AID WITH INDIRECT LASER EXPOSURE

BACKGROUND OF THE INVENTION

1. Field of the Invention

The present invention concerns a rapid prototyping method to manufacture a component of a hearing aid of the type that includes generating a laser beam, providing a workpiece support that can be directly exposed by the laser beam within a predetermined solid angle range, and curing material on the workpiece support with the laser beam.

2. Description of the Prior Art

Hearing aids are wearable hearing devices that serve to assist persons with hearing impairment. In order to accommodate numerous individual needs, different structural shapes of hearing aids are provided, such as behind-the-ear hearing aids (BtE), hearing aids with external earpiece (RIC: receiver in the canal) and in-the-ear hearing aids (ItE), as well as concha hearing aids or canal hearing aids, for example (ITE, CIC). The hearing aids listed as examples are worn on the outer ear or in the auditory canal. Moreover, bone conduction hearing aids, and implantable or vibro-tactile hearing aids are commercially available. Stimulation of the damaged hearing anatomy thereby ensues either mechanically or electrically.

Hearing aids in principle have as essential components, an input transducer, an amplifier and an output transducer. The input transducer is normally a sound receiver (for example a microphone) and/or an electromagnetic receiver (for example an induction coil). The output transducer is most often realized as an electroacoustic transducer (for example a miniature speaker) or as an electromechanical transducer (for example bone conduction earpiece). The amplifier is typically integrated into a signal processing unit. This basic design is shown in FIG. 1 in the example of a behind-the-ear hearing aid. One or more microphones 2 to receive the sound from the environment are installed in a hearing aid housing 1 to be worn behind the ear. A signal processing unit 3 that is likewise integrated into the hearing aid housing 1 processes the microphone signals and amplifies them. The output signal of the signal processing unit 3 is transferred to a speaker or earpiece 4 that outputs an acoustic signal. The sound is possibly transmitted to the eardrum of the device wearer via a sound tube that is fixed in the auditory canal with an otoplastic. The power supply of the hearing aid, and in particular that of the signal processing unit 3, ensues from a battery 5 that is likewise integrated into the hearing aid housing 1.

The term "rapid prototyping" (fast prototype design) means a method to quickly manufacture prototype component parts, starting from design data. In particular, the use of forms that is complicated to produce, for instance by injection molding, can thereby be foregone. Typical rapid prototyping methods are stereolithography (STL or SLA) and selective laser sintering (SLS).

Stereolithography is a method in which a workpiece is built up layer by layer via materializing points. The production of a part or multiple parts typically ensues wholly automatically from CAD data created on a computer. A photocuring plastic (for example epoxy resin) is cured in thin layers by a laser.

In contrast to this, selective laser sintering is a method in which spatial structures are produced by sintering from a powdered starting material. It is likewise a layer-by-layer construction method. Arbitrary three-dimensional geometries, even with undercuts (which cannot be produced with a conventional casting technique, for example) can thus be generated by the effect of the laser beams. Thermoplasts (for example polycarbonates, polyamides, polyvinyl chloride) but also metals are used as materials in this method.

Rapid prototyping methods are used in hearing aids, in particular to produce ItE hearing aid shells. Every individually produced ItE hearing aid shell is unique and thus cannot be produced economically in an injection molding method. The rapid prototyping method is therefore suitable to immediately produce an appropriate hearing aid shell from the individual auditory canal data. However, other component parts of a hearing aid (for example frames, support hooks and other small plastic parts) can also be produced cost-effectively with a rapid prototyping method if a large batch does not need to be provided.

In the event that a workpiece blank already carries a component before the material buildup with a rapid prototyping method, under which component (relative to the exposure with the laser) a hollow space is located into which the laser cannot directly penetrate, no material can be built in this hollow space by the rapid prototyping method. In such cases it is necessary for the workpiece blank to be initially provided without this component, and the material is subsequently built up with the rapid prototyping method, and finally the component is (normally manually) attached to the final rapid prototyping workpiece. Under these circumstances, an automatic insertion process or insertion step with which the component would otherwise be mounted on the workpiece or the workpiece blank, cannot be used.

SUMMARY OF THE INVENTION

An object of the present invention is to further automate the production of hearing aids in which a rapid prototyping method is part of the production process.

This object is achieved by a rapid prototyping method for production of a component of a hearing aid according to the invention that includes:
  generating a laser beam with a laser,
  providing a workpiece support that can be directly exposed by the laser beam curing a workpiece on the workpiece support with the laser beam, and
  deflecting the laser beam with an optic device so that the workpiece support is indirectly exposed with the laser.

It is thus advantageously possible to also subsequently subject, for example, an automatically produced workpiece blank with undercuts to a rapid prototyping method in which material is built up in the undercut. This can be achieved by the laser beam also being indirectly directed to the workpiece by the optic device.

The optic device advantageously is a mirror. A laser beam can be completely deflected with a mirror, such that even remote hollow spaces of a workpiece blank can be reached by the laser beam.

In a special embodiment, the rapid prototyping method is a stereolithography method. A hearing aid component can therefore be produced from a liquid thermosetting plastic by laser curing.

Alternatively, the rapid prototyping method can be selective laser sintering. In this case the hearing aid component part can be produced, for example, from thermoplasts or from a metal.

According to a further embodiment, the workpiece support can bear a workpiece blank with a component below which (relative to the laser) a hollow space is located in which material is built up by curing the material by indirect exposure with the laser. The possibility thus exists to initially automatically populate the workpiece blank with the component without the material having to be built up later with the rapid prototyping method. The component thus does not need to be applied by hand after the rapid prototyping method if the populating can ensure automatically before the curing. Standard component parts can thus be additionally automatically completed before they are subjected to customization with the rapid prototyping.

DESCRIPTION OF THE PREFERRED EMBODIMENTS

Like the entire invention, the following exemplary embodiment refers to a rapid prototyping method in which a laser is used to cure or, respectively, apply material to produce a hearing aid component part. In particular, it should also be possible in a fast process to individually apply material on a workpiece blank that possesses undercuts.

Figure 1:
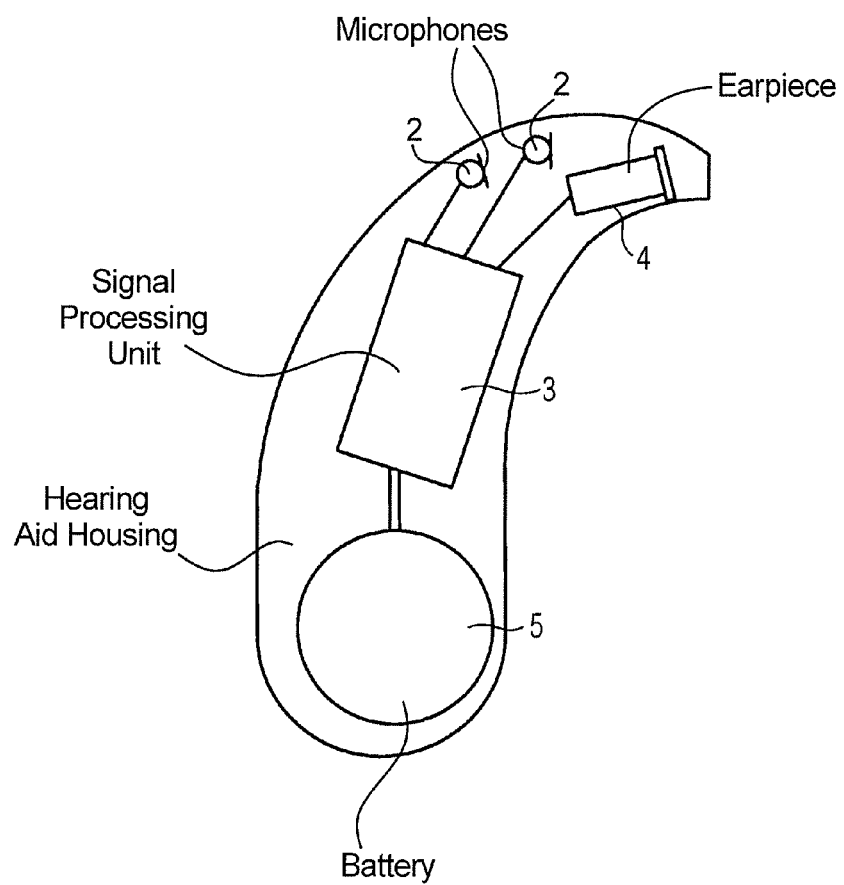
FIG. 1 shows the basic components of a conventional hearing aid according to the prior art.
Figure 2:
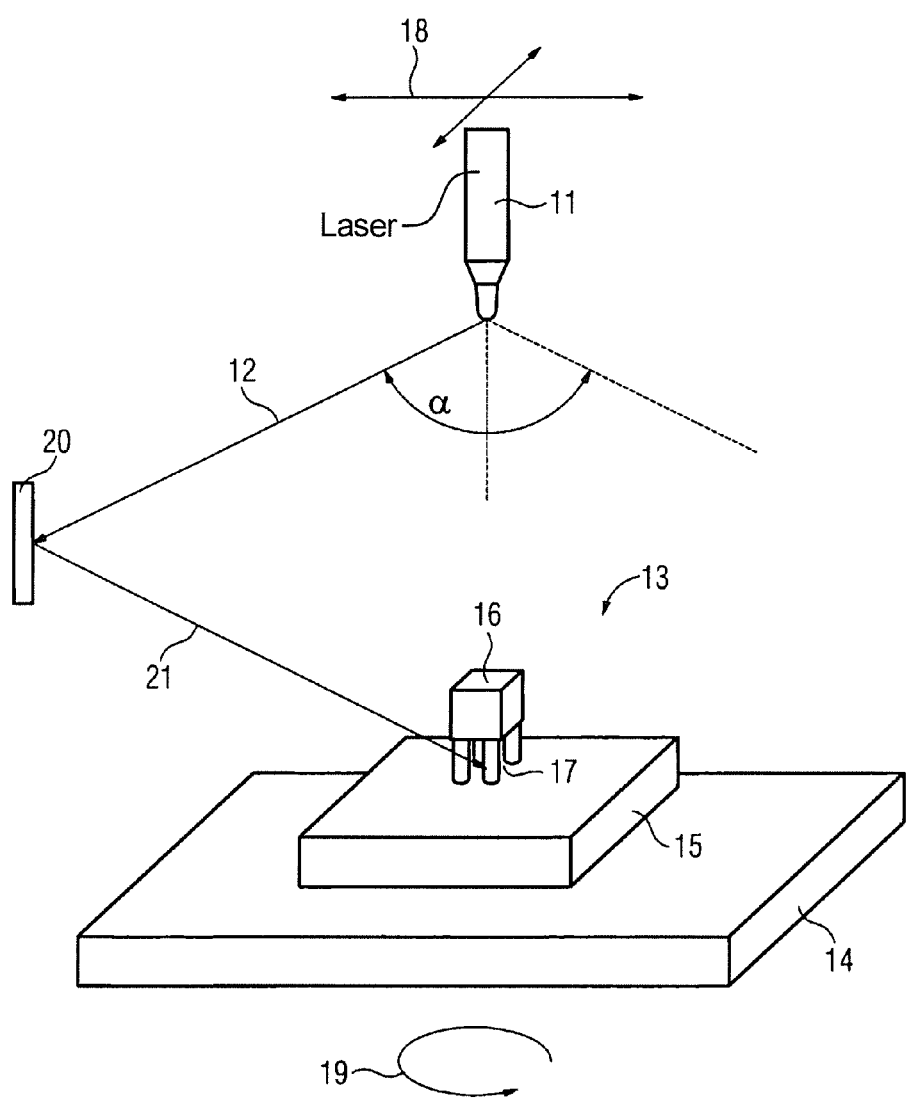
FIG. 2 schematically illustrates the rapid prototyping method according to the invention.

A rapid prototyping device that is suitable for this is schematically depicted in FIG. 2. Only the essential components are displayed. These are initially a laser 11 that serves to generate a laser beam 12. A workpiece blank 13 that is located on a workpiece support 14 should be exposed. The workpiece blank 13 that forms the basis of the hearing aid component part is symbolized here by a plate 15 and a component 16 mounted on the plate 15. A hollow space 17 is located below the component 17 relative to the "viewing direction" of the laser 11, since the component 16 here is mounted on supports on the plate 15.

In some rapid prototyping apparatuses, the laser 11 can be shifted in a plane above the workpiece support within certain limits according to the arrows 18, relative to the hearing aid component part or workpiece support 14 that is to be produced. The laser 11 can often also be panned in a predetermined solid angle range (symbolized here by the angle α). Moreover, the workpiece support 14 can possibly also rotate around its axis according to arrow 19. However, with these degrees of freedom of the laser 11 relative to the hearing aid component part or workpiece support 14 the undercuts of the workpiece blank 13 here cannot be filled via a rapid prototyping method. Here undercuts would thus exist that always lie in the shadow area of the laser 11.

According to the invention the laser beam 12 is deflected by an optic device, in this case, a mirror 20, so as to indirectly expose the hearing aid component part or the workpiece blank 13 that is to be produced with the laser light. It is apparent that the deflected laser beam 21 can penetrate significantly further below the component 16 than the direct laser beam 12 that originates directly from the laser 11 (that is limited in its movements). If the laser without the mirror 20 can accordingly directly expose the workpiece support 14 only from a predetermined solid angle range, with the aid of the mirror 20 (insofar as this is suitably placed) it can also expose the hearing aid component part or the workpiece support 14 from an additional angle range that lies outside of the predetermined solid angle range. The indirect exposure thus increases the range of incidence of the laser beam on the workpiece.

The mirror 20 can be replaced by any other optic device that deflects the laser beam. For example, the optic device can be an arrangement of multiple mirrors. Moreover, the mirror or mirrors can be dynamically moved. Furthermore, the optic device can also have elements for optical refraction (for example a prism).

According to the present invention, workpiece blanks with undercuts thus can be placed and processed in the rapid prototyping device that, due to their undercuts, could not be processed with conventional rapid prototyping devices. In the specific example, material can now be applied on the plate 15 (possibly also under the component 16) by a rapid prototyping method (for example stereolithography or selective laser sintering) even after automatic population of the plate 15 with the component 16. Automatic population of the plate 15 with the component 16 therefore does not need to be foregone.

Although modifications and changes may be suggested by those skilled in the art, it is the intention of the inventors to embody within the patent warranted hereon all changes and modifications as reasonably and properly come within the scope of their contribution to the art.

We claim as our invention:

1. A rapid prototyping method for producing a component of a hearing aid, comprising the steps of:
   providing a workpiece, at least partially comprised of laser-curable material, on a workpiece support;
   generating a laser beam with a laser;
   orienting said laser and said workpiece support relative to each other to cause said workpiece on said workpiece support to have a first portion of said workpiece that is directly exposed by said laser, and curing at least said first portion of said workpiece with direct irradiation thereof by said laser beam; and
   deflecting said laser beam with an optics device, to produce a deflected laser beam, that irradiates indirectly a different, second portion of said workpiece on said workpiece support, that is a hollow space that is shadowed by said workpiece from direct exposure to said laser beam, and curing material in said hollow space with the deflected laser beam.

2. A rapid prototyping method as claimed in claim 1 comprising deflecting said laser beam with a mirror as said optics device.

3. A rapid prototyping method as claimed in claim 1 comprising curing said workpiece with said laser beam in a stereolithography method.

4. A rapid prototyping method as claimed in claim 1 comprising curing said workpiece with said laser beam in a selective laser sintering method.

5. A rapid prototyping method as claimed in claim 1 comprising providing a shell of an ItE hearing aid as said workpiece on said workpiece support.

* * * * *